Aug. 24, 1943.    J. SAUERWEIN    2,327,374
UNDERCUTTER
Filed Nov. 12, 1941
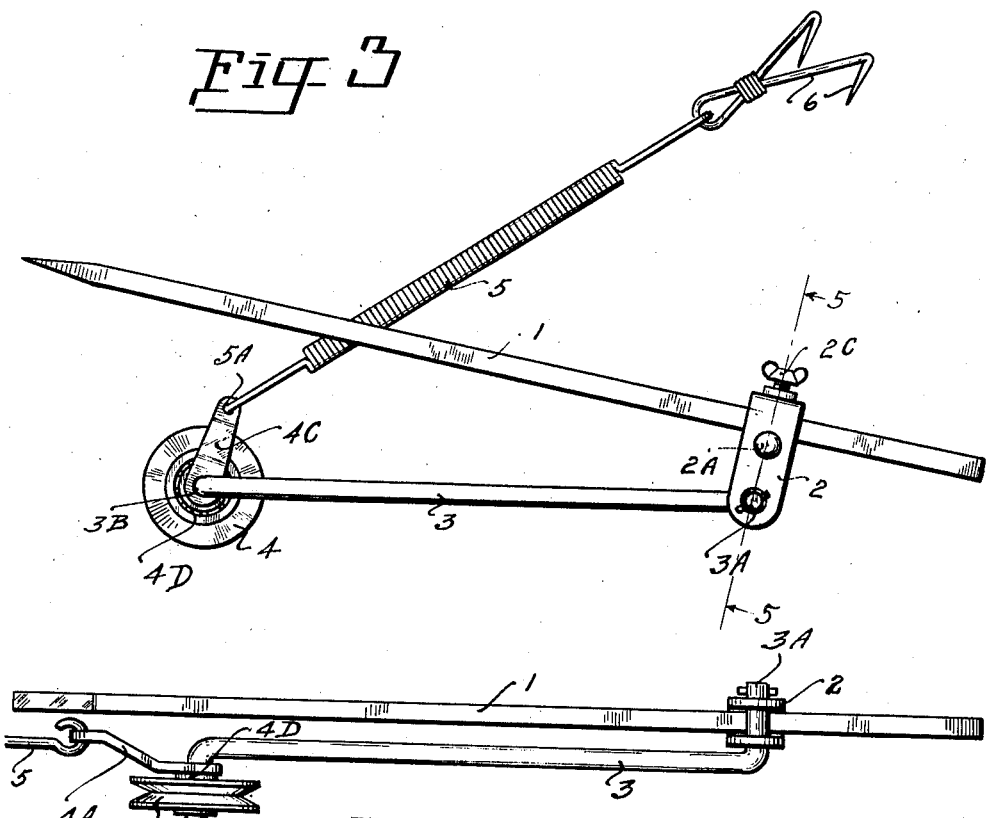
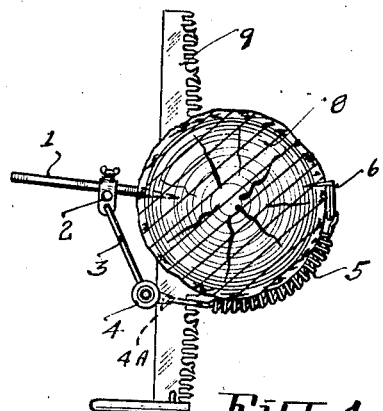
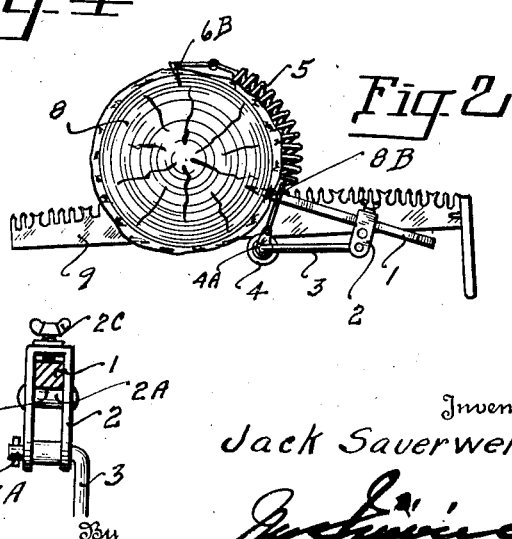
Inventor
Jack Sauerwein
By
Attorney Patented Aug. 24, 1943

2,327,374

UNITED STATES PATENT OFFICE 2,327,374

UNDERCUTTER

Jack Sauerwein, Mollala, Oreg.

Application November 12, 1941, Serial No. 418,788

2 Claims. (Cl. 143—163)

This invention relates to undercutters and is particularly adapted for the falling of trees and for the bucking of logs where a cross-cut saw is to be used by one person.

The primary object of the invention is to provide a guide for holding the saw within the cut being taken of the tree or log where only one person is operating the saw.

A further object of the invention is to provide a device for holding the saw that can be used either in the falling of trees or the bucking of the log.

These and other incidental objects will be apparent in the drawing, specification and claims.

Referring to the drawing:

Figure 1 is a plan view, in section, of a tree being felled.

Figure 2 is a sectional view of a log being bucked.

Figure 3 is a detailed assembly of my new and improved undercutter.

Figure 4 is a plan view of the assembled undercutter, as shown in Figure 3.

Figure 5 is a sectional view, taken on line 5—5 of Figure 3, looking in the direction indicated.

In the drawing:

My new and improved undercutter consists of a pointed bar 1, having a movable bracket 2 slidably mounted thereon. The bracket 2 is held in place by the cross bar 2A. The cross bar 2A is spaced away from the bar 1 at 2B in order to allow for sufficient play between the bracket 2 and the bar 1, so that the undercutter assembly may have a sliding movement relative to the bar 1 while the saw is being operated thereon.

The bracket 2 may be locked to the bar 1 by the wing nut adjustment 2C, or in many cases the bracket 2 will remain on the bar without the wing nut 2C. Pivotally mounted to the outer end of the bracket 2 at 3A is an arm 3, the opposite end of the arm has a stub shaft 3B extending at right angles therefrom. A grooved pulley 4 is journaled to this stub shaft, the groove 4B guides the back of the saw 9 in the sawing operation. The roller 4 is preferably journaled to the shaft 3B by a suitable ball or roller bearing 4D, this bearing reduces wear on the roller 4.

A spring 5 is secured at 5A to the pivotally mounted link 4C at its one end and is provided with a suitable hook device 6 at its opposite end. The link 4C is secured to the stub shaft 4A of the arm 3, best shown in Figures 3 and 4.

In the operation of my new and improved undercutter, as for instance in Figure 1, where the tree is to be felled, the bar 1 is driven into the tree 8. The hook 6 is driven into the bark of the tree. The saw is indicated by numeral 9, the spring 5 pulling the guide roller 4 towards the back of the saw. As the cut is progressed the position of the bar 1 may be changed, together with that of the hook 6, until the cut is completed.

In the bucking operation, shown in Fig. 2, the arrangement is somewhat similar except that the bar is driven into the log at 8B and the hook 6 is located at 6B, supporting the weight of the saw 9 on the roller 4 through the spring 5.

It has been found by experience that a heavier spring should be employed for the bucking operation illustrated by Figure 2, than that used for the falling operation in Figure 1. By observing the drawing, Figures 1 and 2, it will be noted that there is considerable flexibility afforded between the undercutter guide roller 4 and the operating handle 5A requiring but one person to operate the saw.

I do not wish to be limited to the particular mechanical construction illustrated, as other mechanical equivalents may be employed, still coming within the scope of the claims to follow.

What is claimed as new is:

1. An undercutter including a bar to be driven into a tree or log, a bracket slidable on the bar, a rod supported in the bracket for swinging in a complete circular plane at one side of the plane of the rod, a saw-supporting roller carried by the rod remote from the bracket, and means whereby the roller-carried end of the rod may be connected under yielding tension direct to the tree or log.

2. A construction as defined in claim 1, wherein the means for connecting the roller-carried end of the rod to the tree or log, includes an element mounted for free rotation on the axis of the roller, a coil spring connected at one end to the element, and a tree or log engaging hook carried by the other end of the spring to provide selective tensioning of the spring by engaging the hook in a selected point of the tree or log remote from the roller to cause the spring to contact and partly embrace the tree or log.

JACK SAUERWEIN.